April 27, 1943.   F. A. CHEKIAN   2,317,669
FRUIT HALVING DEVICE
Filed Aug. 17, 1942
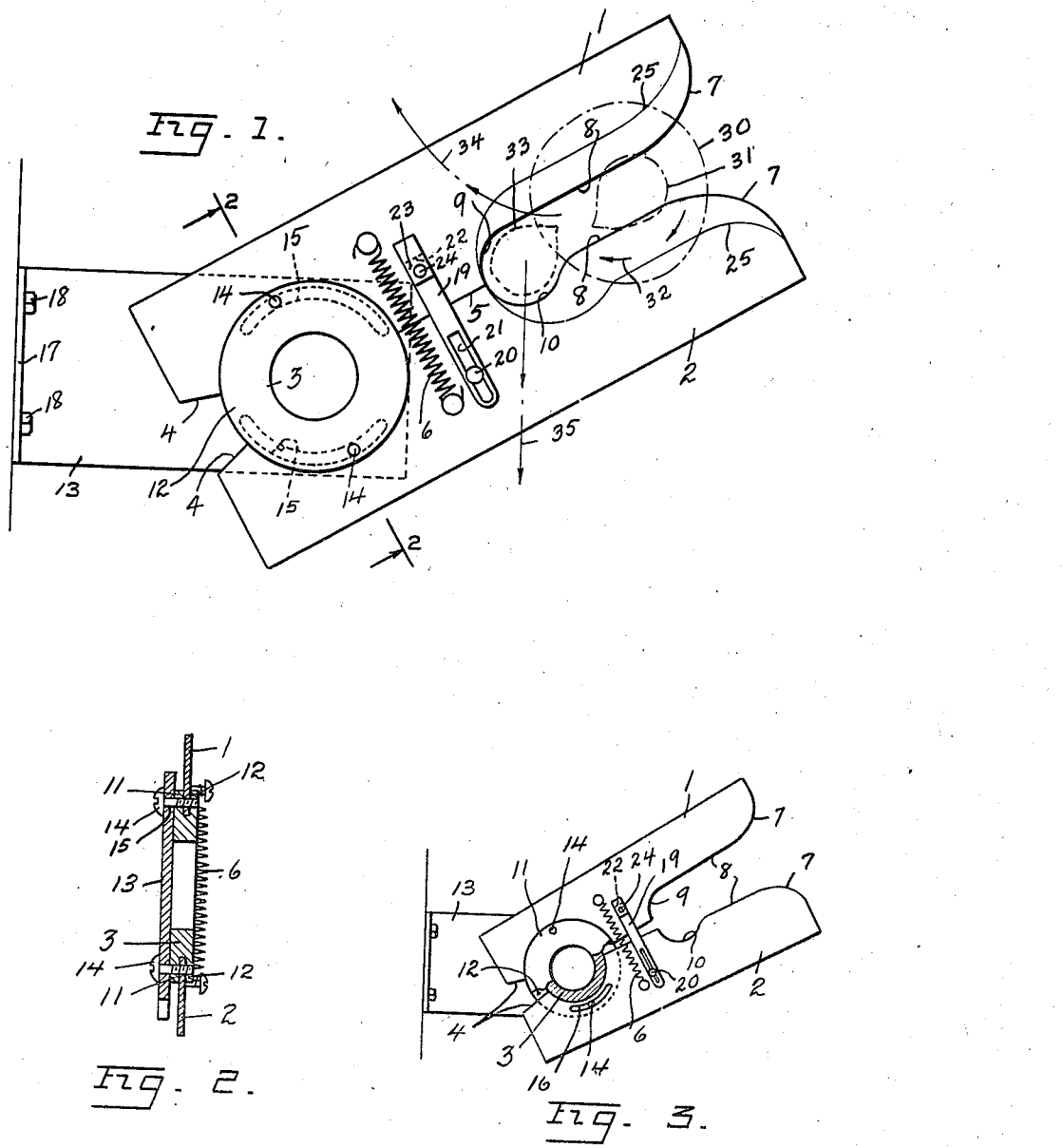
INVENTOR.
FRANK A. CHEKIAN
BY
Boykin Mohler & Beckley
ATTORNEYS.

Patented Apr. 27, 1943

2,317,669

UNITED STATES PATENT OFFICE 2,317,669

FRUIT HALVING DEVICE

Frank A. Chekian, Modesto, Calif.

Application August 17, 1942, Serial No. 455,070

10 Claims. (Cl. 146—28)

This invention relates to a fruit halving device, and has for objects a simple, economically made and highly efficient device for halving freestone drupes so that the pit or stone in each drupe that is halved will drop therefrom upon separation of the halves, and which halving operation is accomplished in a substantially single continuous movement of the fruit by the hands of the operator in which the halves of the fruit are respectively held in the hands during said movement and after separation thereof.

Another object is a fruit halving device for halving freestone fruit such as peaches or apricots without multilation of the pit cavity in each fruit, and which device will bisect the meat or endocarp of each fruit successively presented thereto completely to the stone irrespective of variations in the sizes of the stones, and which device includes a pair of co-planar, elongated, spaced cutting blades free at opposite sides thereof and along their cutting edges from obstructions to the hands of an operator holding and manipulating each fruit during the halving operation.

A still further object is an improved method of bisecting freestone fruit in one continuous movement of the fruit along a path of travel and dropping the pit from the fruit at a point in said path.

Briefly described, the most universal practice now employed for bisecting and pitting freestone peaches and apricots is one in which the operator supports the whole fruit in one hand and bisects the fruit by a knife or other implement held in the other hand, after which the pit is removed. While the halving by this method is reasonably satisfactory, the procedure is relatively slow and hard on the fingers and hands of the operator.

With my device, each fruit is picked up by both hands of the operator who then moves it in one continuous motion between the cutting blades of my device, giving the fruit about a quarter turn during said movement at a point between said blades without stopping the continued movement along the blades. The pit is freed from the fruit when the quarter turn of the latter is effected and the pit is released from between the blades at a point therealong and freely drops as the operator moves the halves apart. The blades themselves are movable relative to each other in the plane in which they are disposed and are adjusted so that their cutting edges will closely engage opposite sides of the pit at all times irrespective of variations in the size of the pit and its position between the blades insofar as its major and minor axes are concerned.

It is particularly pertinent to note that this invention is not intended or adapted for use in connection with clingstone fruit, and one of its important features is structure that will eliminate all possible resistance to free movement of the fruit during the halving operation. Thus, the blades are relatively thin (but relatively flexible) and are of substantially uniform thickness, and are so mounted that their cutting edges will follow the contour of the pit with least resistance and will cut to the pit.

In the drawing,

Fig. 1 is an elevational view of my device in one operating position.

Fig. 2 is a sectional view taken along line 2—2 of Fig. 1.

Fig. 3 is a reduced size, part sectional, part elevational view of my device with the blades in an adjusted position for large graded fruit.

The device illustrated comprises a pair of elongated blades 1, 2, supported and held at one of their end portions in co-planar relation, preferably in a substantially vertical plane.

The blades 1, 2 are supported at one of their end portions on the peripheral surface of a cylindrical element 3, the opposed edges of said blades being linearly of arcuate contour to slidably fit on said surface with the said element between said curved edges of the blades, as best seen in Fig. 3. Thus, one or both of the blades will be revolvable about the axis of said element 3.

At one side of the element 3, the corresponding ends of the curved edges of the blades are spaced apart, and from said ends the opposed edges extend divergently outwardly a relatively short distance as indicated at 4 in Fig. 3, and said edges 4 terminating at their divergent ends at the corresponding end edges of one of the ends of the blades.

At the opposite side of the element 3, where ungraded fruit is to be halved, the opposed edges 5 of the blades are in meeting relation for a substantial distance outwardly of said element from said opposite side, as best indicated in Fig. 1, and a coil spring 6 adjacent element 3 respectively secured at its opposite ends to said blades yieldably holds said edges 5 in meeting relation.

Blades 1 and 2 are formed outwardly of the meeting edges 5 (in direction away from element 3) with spaced cutting edges that curve convergently from the outer ends of the blades, as at 7, to substantially parallel spaced relation, as at 8. These parallel portions of the cutting edges extend a substantial distance from curved edges 7 toward element 3, providing a path between said parallel edges for the pit of a fruit body to be halved.

At its end adjacent the outer ends of edges 5, the cutting edges 8 of blades 1, 2 are respectively curved to meet at the said outer ends of edges 5, as indicated at 9, 10, the line of said curve being about an axis that is offset toward blade 2 relative to a line parallel with edges 8 and midway between said latter edges so that the curved cutting edge 10 will extend into blade 2 and away from edge 8 of blade 1, thus providing an enlargement in the path for the pit adjacent the inner end thereof that is nearest the element 3 and outer ends of meeting edges 5.

The end portions of blades 1, 2 that are slidable on element 3 are held between flanges 11, 12 carried on element 3, thereby preventing displacement of the blades from co-planar relation, and the element 3 is secured to a bracket 13 by machine screws 14 that extend through slots 15 in bracket 13 (Fig. 1) and threadedly engage openings in flanges 11, 12, although the screws may extend freely through the openings in flange 11 and threadedly engage the coaxial openings in flange 12.

The slots 15 are longitudinally coaxial with the central axis of element 3 and are at opposite sides of the latter, and each of the blades 1, 2 is formed with a slot 16 (Fig. 3) through which the screws 14 freely extend. When the edges 5 of the blades are in meeting relation, the screws 14 are, of course, at one of the ends of the slots 16, whereby the blades always are restored to a predetermined uniform position.

The bracket 13 is adapted to be secured by any suitable means, such as flange 17 and bolts 18 to the frame of a conveyor or to any suitable support.

Adjacent spring 6, I may secure a strip 19 to blade 2 by a screw 20 extending through slot 21 in said strip for longitudinal adjustment of said strip relative to said blade. Said strip extends across the edges 5 to abut at its end against a stop 22 secured to blade 1, and which stop has a lip 23 overlying the end of strip 19 in which lip 6 a set screw 24 may be threadedly held.

In the event relatively large, graded fruit is being halved, it is desirable that the cutting edges be more widely spaced than is shown in Fig. 1 in the initial position of the blades, thus relieving the operator of the effort required to force the blades from the position shown in Fig. 1 to the spacing indicated in Fig. 3; therefore, strip 19 is locked to blade 2 so that its abutment with stop 22 will hold the blades spaced apart as indicated in Fig. 3. It is understood, of course, that set screw 24 is not engaged with the end of the strip 19, therefore the blades 1, 2 can still move apart, but will return to the position indicated in Fig. 3. The set screw 24 is only used where it may be desirable to lock the blades 1, 2 together against relative movement.

By loosening the screws 14, the member 3 with its flanges 11, 12 may be rotated about the axis of said member and then clamped tightly to the bracket in any desired position, such as shown in Fig. 1, or in any angular relation to vertical, whether extended upwardly or downwardly relative to said axis. Different operators prefer different positions according to the position of the device relative to the source of fruit or for other reasons.

In Fig. 1, the lines indicated at 25 on blades 1, 2 indicate the commencement of the beveled opposite sides of the blades where the opposite surfaces of the blade commence converging to the cutting edges. Oppositely outwardly of these lines there is a relatively slight convergence of the opposite surfaces of the blades toward the outer edges thereof, but this convergence is only slight enough to reduce the frictional resistance that would otherwise exist were said surfaces parallel. While this slight convergence is not essential to the halving of the fruit halves, it is important that the blades be as thin as possible consistent with the necessary rigidity of the blades to prevent bending or flexing when in use. Thus a spreading of the flesh of the fruit is reduced to the minimum, which is essential to fast and sustained speed of the operator over many hour's time.

The edges of the enlarged end of the passageway defined by the cutting edges 8 of the blades, and which enlarged end is defined by edges 9, 10, may be somewhat blunt at their ends adjacent the ends of edges 5, but otherwise the cutting edges should extend substantially as indicated at 9, 10.

The halving of the fruit halves should be substantially coincident with the plane of the suture to produce the best appearance of the fruit halves after the pit has been dropped therefrom.

In operation, the operator grasps a fruit body, such as a peach 30 (indicated in dot-dash line in Fig. 1) by the fingers of the hands at opposite sides of the plane of the suture, and then thrusts the peach onto blades 1, 2 with the said suture co-planar with the plane of the blades and in a manner so that pit 31 (dot-dash line in Fig. 1) will move along a path between the cutting edges 8 of blades 1, 2. Obviously, with a pit the size of pit 31, the blades 1, 2 will be forced apart, and it is preferable that the space between edges 8 be such that the minimum sized pit in the batch being halves will be engaged by cutting edges 8 so that the flesh or meat around the pit will be cut completely to the pit.

When the pit is in the position indicated at 31, the operator rotates it a quarter of a turn on its axis, as indicated generally by arrows 32, but without stopping its movement longitudinally of edges 8 toward edges 9, 10. The pit 31 will be carried into the position 33 in the wider or enlarged space between edges 9, 10, where the pit is free from engagement by the blades, and then movement of the halves divergently outwardly of the plane of the blades along path 34 will result in the pit dropping from the halves along path 35.

By my apparatus, it is seen that extremely fast halving of fruit and removal of the pits therefrom is accomplished, since there is no stoppage of the fruit and it is carried by the hands along a simple path that is first straight and then divergently outward with the pit dropping from the halves adjacent the point where the halves move from said parallel paths along divergent paths. At no time during said movement is the fruit stationary or are the hands removed therefrom. After the halves are carried divergently outwardly a sufficient distance to release the pit, they are cast onto a conveyor or into any suitable receptacle.

The provision for rotation of both blades on member 3, is preferable to structure where only one blade is moved, but it is not absolutely essential that both of said blades be movable.

The drawings are not to be considered as restrictive to the precise structure shown, since it is clear that structural modifications may be made within the scope of the invention.

It is pertinent to note that it is not necessary to the accomplishment of the desired results that the stem ends of the fruit be in any particular position in the plane of the suture with respect to the axis of the fruit perpendicular to said plane. Whether the stem end is up, down, or is directed toward or away from the closed end of the path between the cutting blades is immaterial. The blades will yieldably move apart so that the cutting edges will follow the contour of the pit whether the major axis of the pit is parallel with said path or is vertical or at any degree of inclination between vertical and horizontal. Also, if for any reason, a pit should accidentally be lodged in the enlarged inner end of the path between the cutting edges of the blades, the rotation of a pit between edges 8 will cause slight spreading of the blades so as to release any pit so lodged.

Having described my invention, I claim:

1. A fruit halving device comprising a pair of elongated, co-planar halving blades having opposed, parallel cutting edges spaced apart to provide a path for the pit of the fruit therebetween, a supporting bracket, pivot means supporting said blades at one of their ends on said bracket for relative movement apart in their plane about an axis substantially on a line extending between said blades, and spring means connecting said blades for yieldably resisting said movement.

2. A fruit halving device comprising a pair of elongated, co-planar halving blades spaced apart to provide a path for the pit of the fruit therebetween, a cylindrical element positioned between said blades at one of their ends with its axis perpendicular to the plane of said blades supporting the adjacent free edges of said blades at their said ends thereon for sliding circumferentially thereof, the said adjacent free edges of said blades being curved to substantially conform to the curvature of the outer surface of said element, spring means connecting said blades for yieldably resisting movement of said blades apart, and stop means limiting movement of said blades toward each other.

3. A fruit halving device comprising a pair of elongated, co-planar halving blades spaced apart to provide a path for the pit of the fruit therebetween, a bearing slidably engaging the free adjacent edges of said blades at one of their ends for revolvable movement of said blades in their plane on said bearing about its axis, means securing said blades on said bearing, a spring adjacent said bearing connecting said blades for yieldably resisting said movement of said blades relative to each other, means connecting said bearing with said support for holding said blades in predetermined positions projecting from one side of said bearing, said last mentioned means including relatively movable elements respectively rigid with said blades and said bearing held by said spring in yieldable engagement but separable upon forcibly urging said blades apart against the resistance of said spring.

4. A fruit halving device comprising a bracket member, a pair of co-planar halving blades spaced apart to provide a path for the pit of the fruit therebetween, a pivot element supporting one of said blades at one of its ends for pivotal movement away from the other of said blades, means releasably securing said bracket member to said blades adjacent said pivot element for swinging said blades bodily in their plane, means locking said blades in adjusted position against so swinging, and spring means yieldably resisting said pivotal movement of one of said blades connected to the latter.

5. A fruit halving device comprising a bracket member, a pair of co-planar halving blades spaced apart to provide a path for the pit of the fruit therebetween, a pivot element substantially on a line extending between said blades supporting one of said blades at one of its ends for pivotal movement of the opposite end of said blade away from the other of said blades, means releasably securing said bracket member to said pivot element for swinging of said blades bodily therewith in their plane about the axis of said element, means locking said pivot element against rotation for securing said blades against so swinging, and spring means yieldably resisting said pivotal movement of one of said blades connected to the latter.

6. A fruit halving device comprising a cylindrical bearing having coaxially spaced, radially outwardly projecting flanges secured thereto, a pair of co-planar, elongated halving blades arcuately recessed on their adjacent edges and positioned with the curved edges of such recesses slidably supported on said bearing for revolution of said blades about the axis of the bearing; the adjacent edges of said blades at one side of said bearing being spaced apart and that portion of the adjacent edges of said blades adjacent said bearing at the opposite side of said bearing being in meeting engagement, the remainder of the adjacent edges of said blades at the said opposite side of said bearing being spaced apart and sharpened to provide a path between said blades for the pit of the fruit to be halved, spring means yieldably securing the said engaging portions of the adjacent edges of said blades together and holding said curved edges of said blades on said bearing, means secured to said bearing for supporting the latter in a predetermined fixed position, and means connecting between said bearing and said blades for limiting the revolvable movement of said blades on said bearing.

7. A fruit halving device comprising a pair of elongated, co-planar, halving blades spaced apart to provide a path for the pit of the fruit therebetween, pivot means supporting one of said blades at one of its ends for relative movement of the opposite end of said blade in its plane about the axis of said pivot means, abutting elements respectively carried by said blades limiting movement of said blades toward each other, one of said elements being movable toward and away from the elements on the other of said blades for adjustably spacing said blades apart, means securing said movable element in adjusted position to the blade carrying the same, and means yieldably holding said blades in position with said elements in abutting relation.

8. In a construction as defined in claim 7, means on the said other of said blades releasable for securing the abutting end portion of the said movable element to said other of said blades whereby said blades may be rigidly locked together in spaced relation if so desired.

9. A device for having a freestone drupe comprising a pair of co-planar, elongated blades formed with substantially, parallel, spaced cutting edges along a length of their adjacent edges, said cutting edges terminating at one of the corresponding ends of said pair of blades in divergently extending cutting edges, the opposite ends of said parallel cutting edges being formed with combinations thereof linearly curved to provide an enlarged space between said continuations relative to the space between said parallel edges and terminating in substantially meeting relation, pivot means adjacent the ends of said blades opposite the ends having said curved cutting edges supporting said blades in said plane and mounting said blades for swinging apart of the parallel cutting edges thereof, and a spring between said pivot means and the said terminating ends of said continuations of the cutting edges connecting said blades and for yieldably resisting said swinging apart of said parallel cutting edges.

10. In a construction as defined in claim 9, the said enlarged space being sufficient to freely encircle the pit of the drupe to be halved, and the space between said parallel cutting edges being substantially equal to the minor axis of such pit, the said blades being relatively thin and of substantially uniform thickness outwardly of said cutting edges for their full length; and the opposite sides and opposite outer elongated edges of said pair of blades being free from obstructions to the movement of halves of a drupe to be pitted in directions longitudinally and transversely of said pair of blades in the planes of said opposite sides from said curved cutting edges to the meeting edges of the blades at one side of said enlarged space.

FRANK A. CHEKIAN.